(12) United States Patent
Lu

(10) Patent No.: US 10,802,870 B2
(45) Date of Patent: Oct. 13, 2020

(54) VIRTUAL MACHINE LIVE MIGRATION METHOD, VIRTUAL MACHINE MEMORY DATA PROCESSING METHOD, SERVER, AND VIRTUAL MACHINE SYSTEM

(71) Applicant: Huawei Technologies Co., Ltd., Shenzhen (CN)

(72) Inventor: Shengwen Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 807 days.

(21) Appl. No.: 14/794,325

(22) Filed: Jul. 8, 2015

(65) Prior Publication Data

US 2015/0309839 A1 Oct. 29, 2015

Related U.S. Application Data

(63) Continuation of application No. PCT/CN2014/093034, filed on Dec. 4, 2014.

(30) Foreign Application Priority Data

Dec. 31, 2013 (WO) ................. PCT/CN2013/091131

(51) Int. Cl.
*G06F 9/455* (2018.01)
*G06F 9/48* (2006.01)
(Continued)

(52) U.S. Cl.
CPC ........ *G06F 9/4856* (2013.01); *G06F 9/45558* (2013.01); *G06F 9/5016* (2013.01);
(Continued)

(58) Field of Classification Search
CPC ............... G06F 9/45558; G06F 9/5016; G06F 2009/4557; G06F 3/0647; G06F 2212/657
(Continued)

(56) References Cited

U.S. PATENT DOCUMENTS 7,813,366 B2 * 10/2010 Freimuth ............ G06F 13/4282
370/419
8,156,253 B2 4/2012 Watanabe
(Continued)

FOREIGN PATENT DOCUMENTS

CN 101101562 A 1/2008
CN 101645832 A 2/2010
(Continued)

OTHER PUBLICATIONS

Partial English Translation and Abstract of Chinese Patent Application No. CN101101562, Sep. 9, 2015, 24 pages.
(Continued)

*Primary Examiner* — Titus Wong
(74) *Attorney, Agent, or Firm* — Conley Rose, P.C.

(57) ABSTRACT

A virtual machine live migration method and a server, to resolve a problem that live migration of a virtual machine cannot be implemented in an SR-IOV technology scenario. According to the virtual machine live migration method and the server in the embodiments of the present invention, by setting a dirty write flag, a virtual PCIE device of a to-be-migrated virtual machine performs at least one read and write operation on received data; a virtual machine manager of the to-be-migrated virtual machine can identify a change in the data and migrate changed data to a destination virtual machine, thereby resolving a problem in the prior art that data cannot be migrated during a virtual machine live migration process because the data passes through the virtual PCIE device but the virtual machine manager cannot perceive the data.

26 Claims, 3 Drawing Sheets

(51) Int. Cl.
*G06F 9/50* (2006.01)
*G06F 13/28* (2006.01)
*G06F 13/42* (2006.01)

(52) U.S. Cl.
CPC ............ *G06F 9/5077* (2013.01); *G06F 13/28* (2013.01); *G06F 13/4221* (2013.01); *G06F 2009/4557* (2013.01); *G06F 2009/45579* (2013.01)

(58) Field of Classification Search
USPC .......................................................... 710/308
See application file for complete search history.

(56) References Cited

U.S. PATENT DOCUMENTS

| | | | |
|---|---|---|---|
| 8,356,120 | B2 | 1/2013 | Tsirkin et al. |
| 8,407,182 | B1 | 3/2013 | Rajaa et al. |
| 8,667,187 | B2* | 3/2014 | Thakkar ................. G06F 13/28 710/22 |
| 9,197,489 | B1* | 11/2015 | Vincent ................. H04L 67/148 |
| 2008/0086729 | A1* | 4/2008 | Kondoh ................. G06F 9/5077 718/1 |
| 2009/0235249 | A1 | 8/2009 | Kobayashi et al. |
| 2010/0153514 | A1* | 6/2010 | Dabagh ............... G06F 13/4022 709/213 |
| 2010/0299666 | A1* | 11/2010 | Agbaria ................ G06F 9/4856 718/1 |
| 2011/0066819 | A1* | 3/2011 | Mashtizadeh ........... G06F 16/21 711/162 |
| 2012/0030674 | A1* | 2/2012 | Mundkur ............ G06F 13/4022 718/1 |
| 2012/0096192 | A1* | 4/2012 | Tanaka .................. G06F 13/385 710/20 |
| 2012/0137098 | A1 | 5/2012 | Wang et al. |
| 2012/0159101 | A1 | 6/2012 | Miyoshi |
| 2012/0179855 | A1* | 7/2012 | Tsirkin ................ G06F 9/45558 711/6 |
| 2012/0180042 | A1* | 7/2012 | Tsirkin ................ G06F 9/45558 718/1 |
| 2012/0254862 | A1* | 10/2012 | Dong .................... G06F 9/4856 718/1 |
| 2013/0326177 | A1 | 12/2013 | Oiwa |
| 2013/0346977 | A1* | 12/2013 | Rasmusson ......... G06F 9/45533 718/1 |
| 2014/0047183 | A1* | 2/2014 | Chawla ................. G06F 12/084 711/119 |
| 2015/0052282 | A1 | 2/2015 | Dong |
| 2015/0052322 | A1* | 2/2015 | Tsirkin .................. G06F 9/4856 711/162 |

FOREIGN PATENT DOCUMENTS

| | | |
|---|---|---|
| CN | 102073462 A | 5/2011 |
| CN | 102118458 A | 7/2011 |
| CN | 102457439 A | 5/2012 |
| CN | 102662751 A | 9/2012 |
| CN | 102681913 A | 9/2012 |
| CN | 103064733 A | 4/2013 |
| CN | 103201721 A | 7/2013 |
| CN | 103414769 A | 11/2013 |
| CN | 103890728 A | 6/2014 |
| JP | 20090217608 A | 9/2009 |
| JP | 2013250950 | 12/2013 |

OTHER PUBLICATIONS

Partial English Translation and Abstract of Chinese Patent Application No. CN101645832, Sep. 9, 2015, 5 pages.
Partial English Translation and Abstract of Chinese Patent Application No. CN102457439, Sep. 9, 2015, 6 pages.
Partial English Translation and Abstract of Chinese Patent Application No. CN103890728, Part 1, Jun. 19, 2015, 5 pages.
Partial English Translation and Abstract of Chinese Patent Application No. CN103890728, Part 2, Jun. 19, 2015, 3 pages.
Foreign Communication From a Counterpart Application, Chinese Application No. 201380002728.1, Chinese Search Report dated Aug. 12, 2014, 6 pages.
Foreign Communication From a Counterpart Application, PCT Application No. PCT/CN2013/091131, English Translation of International Search Report dated Oct. 9, 2014, 2 pages.
Foreign Communication From a Counterpart Application, PCT Application No. PCT/CN2013/091131, Written Opinion dated Oct. 9, 2014, 5 pages.
Foreign Communication From a Counterpart Application, PCT Application No. PCT/CN2014/093034, English Translation of International Search Report dated Feb. 27, 2015, 3 pages.
Foreign Communication From a Counterpart Application, PCT Application No. PCT/CN2014/093034, Written Opinion dated Feb. 27, 2015, 7 pages.
Pan, Z., et al., "CompSC: Live Migration with Pass-through Devices," Proceedings of the 8th ACM SIGPLAN/SIGOPS Conference on Virtual Execution Environments, Mar. 3-4, 2012, pp. 109-120.
Foreign Communication From a Counterpart Application, European Application No. 14870652.6, Extended European Search Report dated May 19, 2016, 7 pages.
Partial English Translation and Abstract of Japanese Patent Application No. JPA2009217608, Nov. 28, 2016, 24 pages.
Foreign Communication From a Counterpart Application, Chinese Application No. 201480055409.1, Chinese Search Report dated Sep. 19, 2016, 11 pages.
Foreign Communication From a Counterpart Application, Japanese Application No. 2015-555590, Japanese Office Action dated Oct. 4, 2016, 3 pages.
Foreign Communication From a Counterpart Application, Japanese Application No. 2015-555590, English Translation of Japanese Office Action dated Oct. 4, 2016, 3 pages.
Foreign Communication From a Counterpart Application, Japanese Application No. 2015-555590, Japanese Notice of Allowance dated Apr. 4, 2017, 3 pages.
Zhai, E., et al., "Live Migration with Pass-through Device for Linux VM," XP055223917, Proceedings of the Linux Symposium (OLS), vol. two, Ottawa, Ontario Canada, Jul. 23-26, 2008, 9 pages.
Foreign Communication From a Counterpart Application, Chinese Application No. 18186202.0, Extended European Search Report dated Jul. 31, 2019, 11 pages.

* cited by examiner

VIRTUAL MACHINE LIVE MIGRATION METHOD, VIRTUAL MACHINE MEMORY DATA PROCESSING METHOD, SERVER, AND VIRTUAL MACHINE SYSTEM

CROSS-REFERENCE TO RELATED APPLICATIONS

This application is a continuation of International Application No. PCT/CN2014/093034, filed on Dec. 4, 2014, which claims priority to International Application No. PCT/CN2013/091131, filed on Dec. 31, 2013, both of which are hereby incorporated by reference in their entireties.

TECHNICAL FIELD

The present invention relates to the field of information technologies, and in particular, to a virtual machine live migration method, a virtual machine memory data processing method, a server, and a virtual machine system.

BACKGROUND

Single-Root Input/Output (I/O) Virtualization (SR-IOV) is an I/O virtualization technology, and this technology may create, by means of virtualization, multiple virtual Peripheral Component Interconnection Express (PCIE or PCIe) devices on one physical PCIE device. A virtual PCIE device can be configured and managed only using an original physical PCIE device, and each virtual PCIE device may have an independent interrupt and Direct Memory Access (DMA). Therefore, a virtual machine can directly access a physical PCIE device using a virtual PCIE device, without requiring interference from a Virtual Machine Monitor (VMM). A network interface card that supports SR-IOV is used as an example. Each virtual PCIE device corresponds to one virtual network interface card. Packet exchange is directly performed between a virtual PCIE device and a corresponding virtual network interface card, without requiring involvement of a VMM. Therefore, an overhead of the VMM can be reduced and performance of virtual exchange is improved.

After a server implements virtualization, live migration of a virtual machine can be conveniently implemented, and a key of the live migration of a virtual machine is migration of a memory. Generally, migration of a memory of a virtual machine may be divided into three stages.

Iterative pre-copy stage: after a migration process of a virtual machine is started, the virtual machine still runs on a source server and a service of the virtual machine is not interrupted. First, all memories of the virtual machine are copied to a destination server, and then changed memory data in the virtual machine is constantly copied in an iterative manner to the destination server. After iteration is performed until a memory that needs to be copied is small enough to reach a specified threshold, the migration process enters a shutdown copy stage.

Shutdown copy stage: the virtual machine is shut down, the service is interrupted, and residual memory data of the virtual machine is copied.

Restoration stage: a destination virtual machine completes restoration processing before running, the destination virtual machine is started, and the entire migration process is complete.

In a scenario in which an SR-IOV technology is used, a data transmission process does not require involvement of a VMM, when a device uses a PCIE interface to transmit data, the VMM cannot control a data transmission behavior. Therefore, during a virtual machine live migration process, the data of the device cannot be migrated during the virtual machine live migration process, and live migration of a virtual machine cannot be implemented.

SUMMARY

Embodiments of the present invention provide a virtual machine live migration method, a virtual machine memory data processing method, a server, and a virtual machine system, to resolve a problem in the prior art that data cannot be completely migrated during live migration of a virtual machine.

An embodiment of the present invention provides a virtual machine live migration method, where the method includes receiving, by a virtual PCIE device, a first message for starting live migration of a virtual machine; where data processed by the virtual machine is transmitted using a physical PCIE device, the virtual PCIE device is a virtual device that runs on the physical PCIE device, and the virtual machine accesses the physical PCIE device using the virtual PCIE device; and setting, by the virtual PCIE device, a dirty write flag according to the first message; where the dirty write flag is used to perform at least one read and write operation on data that passes through the virtual PCIE device.

Optionally, the setting, by the virtual PCIE device, a dirty write flag according to the first message includes setting, by a driver of the virtual PCIE device, the dirty write flag according to the first message; or setting, by the virtual PCIE device, an independent variable as the dirty write flag.

Optionally, the setting, by a driver of the virtual PCIE device, the dirty write flag includes setting, by the virtual PCIE device, the dirty write flag within data space reserved in the driver of the virtual PCIE device.

Optionally, before the receiving, by a virtual PCIE device, a first message for starting live migration of a virtual machine, the method further includes establishing a message channel between the virtual PCIE device and the physical PCIE device, to receive the first message for starting live migration of a virtual machine.

Optionally, the establishing a message channel between the virtual PCIE device and the physical PCIE device includes separately reserving a segment of data space in the driver of the virtual PCIE device and a driver of the physical PCIE device, and implementing message transfer using the reserved data space.

Optionally, the implementing, by the virtual PCIE device and the physical PCIE device, message transfer using the reserved data space includes transferring, by a network interface card of the virtual machine, a message within the reserved data space in a DMA manner, to implement message communication between the virtual PCIE device and the physical PCIE device; or reserving, on a network interface card of the virtual machine, data space used for communication, and separately sharing the reserved data space with the virtual PCIE device and the physical PCIE device.

Optionally, the method is applied to a virtual machine live migration process that is applicable to a SR-IOV technology, and after a page in which all data received before stopping receiving data is located is written dirty, canceling, by the virtual PCIE device, the dirty write flag according to a received second message indicating that the migration is complete.

An embodiment of the present invention further provides a server, where at least one virtual machine runs on the server, data processed by the at least one virtual machine is transmitted using a physical PCIE device, at least one virtual PCIE device runs on the physical PCIE device, and each virtual machine corresponds to one virtual PCIE device; where a first virtual PCIE device among the at least one virtual PCIE device includes a receiving unit configured to receive a first message of virtual machine live start migration corresponding to the first virtual PCIE device; and a setting unit configured to set a dirty write flag according to the first message; where the dirty write flag is used to perform at least one read and write operation on data that passes through the first virtual PCIE device.

Optionally, that the setting unit sets the dirty write flag according to the first message includes setting, by the setting unit, the dirty write flag according to the first message using a driver of the first virtual PCIE device; or setting, by the setting unit, an independent variable as the dirty write flag.

Optionally, the setting, by the setting unit, the dirty write flag using a driver includes setting, by the setting unit, the dirty write flag within data space reserved in the driver of the first virtual PCIE device.

Optionally, the first virtual PCIE device further includes a message channel establishing unit, where the message channel establishing unit is configured to establish a message channel between the first virtual PCIE device and the physical PCIE device so that the receiving unit receives, through the established message channel, the first message for starting live migration of a virtual machine corresponding to the first virtual PCIE device.

Optionally, that the message channel establishing unit establishes the message channel between the first virtual PCIE device and the physical PCIE device includes separately reserving, by the message channel establishing unit, a segment of data space in the driver of the first virtual PCIE device and a driver of the physical PCIE device, and implementing message transfer between the first virtual PCIE device and the physical PCIE device using the reserved data space.

Optionally, that the first virtual PCIE device and the physical PCIE device implement message transfer using the reserved data space includes transferring, by a network interface card of the virtual machine, a message within the reserved data space in a direct memory access DMA manner, to implement message communication between the first virtual PCIE device and the physical PCIE device; or reserving, by the message channel establishing unit on a network interface card of the virtual machine, data space used for communication, and separately sharing the reserved data space with the first virtual PCIE device and the physical PCIE device.

Optionally, the virtual machine corresponding to the first virtual PCIE device is applicable to an SR-IOV technology to implement virtualization; and when receiving a second message indicating that live migration of the virtual machine corresponding to the first virtual PCIE device is complete, the setting unit cancels the dirty write flag according to the second message.

An embodiment of the present invention further provides a first virtual machine memory data processing method, which is applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and when any virtual machine in the virtual machine system is migrated, the method includes receiving, by a to-be-migrated source virtual machine, a message for starting virtual machine migration that is sent by the virtual machine migration management unit; setting, by the source virtual machine, a dirty write flag according to the message for starting virtual machine migration; and when it is determined that the physical network interface card writes new data into a memory of the source virtual machine, reading, by the source virtual machine, the new data from the memory of the source virtual machine according to the dirty write flag, and writing the new data into the memory of the source virtual machine again according to the dirty write flag.

Optionally, the source virtual machine receives a message for shutting down the source virtual machine that is sent by the virtual machine migration management unit; and the source virtual machine writes, according to the message for shutting down the source virtual machine, status information of a virtual network interface card corresponding to the source virtual machine into the memory of the source virtual machine.

Optionally, the source virtual machine receives a status information read notification sent by the physical network interface card, where the physical network interface card sends the status information read notification after writing, according to a received message for shutting down the source virtual machine that is sent by the virtual machine migration management unit, status information of a virtual network interface card corresponding to the source virtual machine into the memory of the source virtual machine; and the source virtual machine reads the status information of the virtual network interface card of the source virtual machine from the memory of the source virtual machine according to the status information read notification, and writes the status information into the memory of the source virtual machine again.

Optionally, the reading, by the source virtual machine, the new data from the memory of the source virtual machine according to the dirty write flag, and writing the new data into the memory of the source virtual machine again according to the dirty write flag includes determining, by the source virtual machine, a memory page that is occupied by the new data and is in the memory of the source virtual machine, reading data in the memory page according to the dirty write flag, and writing the read data into the memory page again according to the dirty write flag.

Optionally, the receiving, by a source virtual machine, a message for starting virtual machine migration that is sent by the virtual machine migration management unit includes reading, by a driver of the virtual network interface card in the source virtual machine, a buffer or a register on the virtual network interface card of the source virtual machine, and acquiring the message for starting virtual machine migration that is directly written into the buffer or the register by the virtual machine migration management unit.

Optionally, the method further includes clearing, by the source virtual machine, the dirty write flag.

An embodiment of the present invention further provides a second virtual machine memory data processing method, which is applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and when any virtual machine in the virtual machine system is migrated, the method includes receiving, by a to-be-migrated source virtual machine, a message for shutting down the source virtual machine that is sent by the virtual machine migration management unit; and writing, by the source virtual machine according to the message for shutting down the source virtual machine, status information of a virtual network interface card corresponding to the source virtual machine into a memory of the source virtual machine.

Optionally, before the receiving a message for shutting down the source virtual machine, the method further includes receiving, by the source virtual machine, a message for starting virtual machine migration that is sent by the virtual machine migration management unit; setting, by the source virtual machine, a dirty write flag according to the message for starting virtual machine migration; and when it is determined that the physical network interface card writes new data into the memory of the source virtual machine, reading, by the source virtual machine, the new data from the memory of the source virtual machine according to the dirty write flag, and writing the new data into the memory of the source virtual machine again according to the dirty write flag.

Optionally, the reading, by the source virtual machine, the new data from the memory of the source virtual machine according to the dirty write flag, and writing the new data into the memory of the source virtual machine again according to the dirty write flag includes determining, by the source virtual machine, a memory page that is occupied by the new data and is in the memory of the source virtual machine, reading data in the memory page according to the dirty write flag, and writing the read data into the memory page again according to the dirty write flag.

Optionally, the method further includes clearing, by the source virtual machine, the dirty write flag.

An embodiment of the present invention further provides a third virtual machine memory data processing method, which is applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and when any virtual machine in the virtual machine system is migrated, the method includes receiving, by a to-be-migrated source virtual machine, a status information read notification sent by the physical network interface card, where the physical network interface card sends the status information read notification after writing, according to a received message for shutting down the source virtual machine that is sent by the virtual machine migration management unit, status information of a virtual network interface card corresponding to the source virtual machine into a memory of the source virtual machine; and reading, by the source virtual machine, the status information of the virtual network interface card of the source virtual machine from the memory of the source virtual machine according to the status information read notification, and writing the status information into the memory of the source virtual machine again.

Optionally, before the receiving the status information read notification, the method further includes receiving, by the source virtual machine, a message for starting virtual machine migration that is sent by the virtual machine migration management unit; setting, by the source virtual machine, a dirty write flag according to the message for starting virtual machine migration; and when it is determined that the physical network interface card writes new data into the memory of the source virtual machine, reading, by the source virtual machine, the new data from the memory of the source virtual machine according to the dirty write flag, and writing the new data into the memory of the source virtual machine again according to the dirty write flag.

Optionally, the reading, by the source virtual machine, the new data from the memory of the source virtual machine according to the dirty write flag, and writing the new data into the memory of the source virtual machine again according to the dirty write flag includes determining, by the source virtual machine, a memory page that is occupied by the new data and is in the memory of the source virtual machine, reading data in the memory page according to the dirty write flag, and writing the read data into the memory page again according to the dirty write flag.

Optionally, the method further includes clearing, by the source virtual machine, the dirty write flag.

An embodiment of the present invention further provides a fourth virtual machine migration method, which is applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and the method includes receiving, by a to-be-migrated source virtual machine, a message for starting virtual machine migration that is sent by the virtual machine migration management unit; setting, by the source virtual machine, a dirty write flag according to the message for starting virtual machine migration; when it is determined that the physical network interface card writes new data into a memory of the source virtual machine, reading, by the source virtual machine, the new data from the memory of the source virtual machine according to the dirty write flag, and writing the new data into the memory of the source virtual machine again according to the dirty write flag; receiving, by the source virtual machine, a message for shutting down the source virtual machine that is sent by the virtual machine migration management unit; writing, by the source virtual machine according to the message for shutting down the source virtual machine, status information of a virtual network interface card corresponding to the source virtual machine into the memory of the source virtual machine; and triggering, by the virtual machine migration management unit, a memory iteration operation, where the memory iteration operation is used to migrate data in the memory of the source virtual machine to a destination virtual machine.

Optionally, the reading, by the source virtual machine, the new data from the memory of the source virtual machine according to the dirty write flag, and writing the new data into the memory of the source virtual machine again according to the dirty write flag includes determining, by the source virtual machine, a memory page that is occupied by the new data and is in the memory of the source virtual machine, reading, according to the dirty write flag, data in the memory page occupied by the new data, and writing, according to the dirty write flag, the read data again into the memory page occupied by the new data.

Optionally, the method further includes notifying, by the source virtual machine, the virtual machine migration management unit of a memory address occupied by the status information so that the virtual machine migration management unit notifies the destination virtual machine of the memory address occupied by the status information.

Optionally, the method further includes acquiring, by the destination virtual machine, the status information from migrated memory data according to the memory address occupied by the status information; and restoring, by the destination virtual machine according to the status information, a virtual network interface card corresponding to the destination virtual machine.

An embodiment of the present invention further provides a fifth virtual machine migration method, which is applied to a virtual machine system, where the virtual machine system includes a virtual machine migration management unit, a physical device, and a network interface card; at least one virtual machine runs on the physical device, at least one virtual network interface card runs on the network interface card, each virtual machine corresponds to one virtual network interface card, and each virtual machine receives and sends a packet using a corresponding virtual network interface card; and the method includes receiving, by a to-be-migrated source virtual machine, a message for starting virtual machine migration that is sent by the virtual machine migration management unit; setting, by the source virtual machine, a dirty write flag according to the message for starting virtual machine migration; when it is determined that new data is written into a memory of the source virtual machine, reading, by the source virtual machine, the new data from the memory of the source virtual machine according to the dirty write flag, and writing the new data into the memory of the source virtual machine again according to the dirty write flag; receiving, by the source virtual machine, a status information read notification sent by the network interface card, where the status information read notification is sent after the network interface card writes status information of a virtual network interface card corresponding to the source virtual machine into the memory of the source virtual machine; and the network interface card triggers, after receiving a message for shutting down the source virtual machine that is sent by the virtual machine migration management unit, a step of writing the status information into the memory of the source virtual machine; reading, by the source virtual machine, the status information of the virtual network interface card of the source virtual machine from the memory of the source virtual machine according to the status information read notification, and writing the status information into the memory of the source virtual machine again; and triggering, by the virtual machine migration management unit, a memory iteration operation, where the memory iteration operation is used to migrate data in the memory of the source virtual machine to a destination virtual machine.

Optionally, the reading, by the source virtual machine, the new data from the memory of the source virtual machine according to the dirty write flag, and writing the new data into the memory of the source virtual machine again according to the dirty write flag includes determining, by the source virtual machine, a memory page that is occupied by the new data and is in the memory of the source virtual machine, reading, according to the dirty write flag, data in the memory page occupied by the new data, and writing, according to the dirty write flag, the read data again into the memory page occupied by the new data.

Optionally, the method further includes notifying, by the source virtual machine, the virtual machine migration management unit of information about a memory page occupied by the status information so that the virtual machine migration management unit notifies the destination virtual machine of the information about the memory page occupied by the status information.

Optionally, the method further includes acquiring, by the destination virtual machine, the status information from migrated memory data according to the information about the memory page occupied by the status information; and restoring, by the destination virtual machine according to the status information, a virtual network interface card corresponding to the destination virtual machine.

An embodiment of the present invention further provides a first virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and a first virtual machine in the virtual machine system includes a receiving unit configured to receive a message for starting virtual machine migration that is sent by the virtual machine migration management unit; a setting unit configured to set a dirty write flag according to the message for starting virtual machine migration; and a processing unit configured to, when it is determined that the physical network interface card writes new data into a memory of the first virtual machine, read the new data from the memory of the first virtual machine according to the dirty write flag, and write the new data into the memory of the first virtual machine again according to the dirty write flag.

Optionally, the receiving unit is further configured to receive a message for shutting down the first virtual machine that is sent by the virtual machine migration management unit; and the processing unit is further configured to write status information of a virtual network interface card corresponding to the first virtual machine into the memory of the first virtual machine according to the message for shutting down the first virtual machine.

Optionally, the receiving unit is further configured to receive a status information read notification sent by the physical network interface card, where the physical network interface card sends the status information read notification after writing status information of a virtual network interface card corresponding to the first virtual machine into the memory of the first virtual machine according to a received message for shutting down the first virtual machine that is sent by the virtual machine migration management unit; and the processing unit is further configured to read, the status information of the virtual network interface card of the first virtual machine from the memory of the first virtual machine according to the status information read notification, and write the status information into the memory of the first virtual machine again.

Optionally, that the processing unit reads the new data from the memory of the first virtual machine according to the dirty write flag, and writes the new data into the memory of the first virtual machine again according to the dirty write flag includes determining, by the processing unit, a memory page that is occupied by the new data and is in the memory of the first virtual machine, reading data in the memory page according to the dirty write flag, and writing the read data into the memory page again according to the dirty write flag.

Optionally, that the receiving unit receives the message for starting virtual machine migration that is sent by the virtual machine migration management unit includes reading, by the receiving unit, a buffer or a register on the virtual network interface card of the first virtual machine, and acquiring the message for starting virtual machine migration that is directly written into the buffer or the register by the virtual machine migration management unit.

Optionally, the first virtual machine further includes a clearing unit, which is configured to clear the dirty write flag.

An embodiment of the present invention further provides a second virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and a first virtual machine in the virtual machine system includes a receiving unit configured to receive a message for shutting down the first virtual machine that is sent by the virtual machine migration management unit; and a processing unit configured to write, according to the message for shutting down the first virtual machine, status information of a virtual network interface card corresponding to the first virtual machine into a memory of the first virtual machine.

Optionally, the receiving unit is further configured to receive a message for starting virtual machine migration that is sent by the virtual machine migration management unit; and accordingly, the first virtual machine further includes a setting unit, which is configured to set a dirty write flag according to the message for starting virtual machine migration; where the processing unit is further configured to, when it is determined that the physical network interface card writes new data into the memory of the first virtual machine, read the new data from the memory of the first virtual machine according to the dirty write flag, and write the new data into the memory of the first virtual machine again according to the dirty write flag.

Optionally, that the processing unit reads the new data from the memory of the first virtual machine according to the dirty write flag, and writes the new data into the memory of the first virtual machine again according to the dirty write flag includes determining, by the processing unit, a memory page that is occupied by the new data and is in the memory of the first virtual machine, reading data in the memory page according to the dirty write flag, and writing the read data into the memory page again according to the dirty write flag.

Optionally, the first virtual machine further includes a clearing unit, which is configured to clear the dirty write flag.

An embodiment of the present invention further provides a third virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and a first virtual machine in the virtual machine system includes a receiving unit configured to receive a status information read notification sent by the physical network interface card, where the physical network interface card sends the status information read notification after writing status information of a virtual network interface card corresponding to the first virtual machine into a memory of the first virtual machine according to a received message for shutting down the first virtual machine that is sent by the virtual machine migration management unit; and a processing unit configured to read the status information of the virtual network interface card of the first virtual machine from the memory of the first virtual machine, and write the status information into the memory of the first virtual machine again.

Optionally, the receiving unit is further configured to receive a message for starting virtual machine migration that is sent by the virtual machine migration management unit; and accordingly, the first virtual machine further includes a setting unit, which is configured to set a dirty write flag according to the message for starting virtual machine migration; where the processing unit is further configured to, when it is determined that the physical network interface card writes new data into the memory of the first virtual machine, read the new data from the memory of the first virtual machine according to the dirty write flag, and write the new data into the memory of the first virtual machine again according to the dirty write flag.

Optionally, that the processing unit reads the new data from the memory of the first virtual machine according to the dirty write flag, and writes the new data into the memory of the first virtual machine again according to the dirty write flag includes determining, by the processing unit, a memory page that is occupied by the new data and is in the memory of the first virtual machine, reading data in the memory page according to the dirty write flag, and writing the read data into the memory page again according to the dirty write flag.

Optionally, the first virtual machine further includes a clearing unit, which is configured to clear the dirty write flag.

An embodiment of the present invention further provides a fourth virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner; and a first virtual machine in the virtual machine system includes a receiving unit configured to receive a message for starting virtual machine migration that is sent by the virtual machine migration management unit, and receive a message for shutting down the first virtual machine that is sent by the virtual machine migration management unit; a setting unit configured to set a dirty write flag according to the message for starting virtual machine migration; and a processing unit configured to, when it is determined that the physical network interface card writes new data into a memory of the first virtual machine, read the new data from the memory of the first virtual machine according to the dirty write flag, write the new data into the memory of the first virtual machine again according to the dirty write flag, and write, according to the message for shutting down the first virtual machine, status information of a virtual network interface card corresponding to the first virtual machine into the memory of the first virtual machine; and accordingly, the virtual machine migration management unit is further configured to trigger a memory iteration operation, where the memory iteration operation is used to migrate data in the memory of the first virtual machine to a second virtual machine, where the second virtual machine is a destination virtual machine to which the first virtual machine is migrated.

Optionally, that the processing unit reads the new data from the memory of the first virtual machine according to the dirty write flag, and writes the new data into the memory of the first virtual machine again according to the dirty write flag includes determining, by the processing unit, a memory page that is occupied by the new data and is in the memory of the first virtual machine, reading, according to the dirty write flag, data in the memory page occupied by the new data, and writing, according to the dirty write flag, the read data again into the memory page occupied by the new data.

Optionally, the first virtual machine further includes a notifying unit configured to notify the virtual machine migration management unit of a memory address occupied by the status information so that the virtual machine migration management unit notifies the second virtual machine of the memory address occupied by the status information.

Optionally, the second virtual machine acquires the status information from migrated memory data according to the memory address occupied by the status information, and restores, according to the status information, a virtual network interface card corresponding to the second virtual machine.

An embodiment of the present invention further provides a fifth virtual machine migration system, where the virtual machine system includes a virtual machine migration management unit, a physical device, and a network interface card; at least one virtual machine runs on the physical device, at least one virtual network interface card runs on the network interface card, each virtual machine corresponds to one virtual network interface card, and each virtual machine receives and sends a packet using a corresponding virtual network interface card; and a first virtual machine in the virtual machine system includes a receiving unit configured to receive a message for starting virtual machine migration that is sent by the virtual machine migration management unit, and receive a status information read notification sent by the network interface card, where the status information read notification is sent after the physical network interface card writes the status information into a memory of the first virtual machine after receiving a message for shutting down the first virtual machine that is sent by the virtual machine migration management unit; a setting unit configured to set a dirty write flag according to the message for starting virtual machine migration; and a processing unit configured to, when it is determined that new data is written into the memory of the first virtual machine, read, the new data from the memory of the first virtual machine according to the dirty write flag, and write the new data into the memory of the first virtual machine again according to the dirty write flag; and the processing unit is further configured to read status information of a virtual network interface card of the first virtual machine from the memory of the first virtual machine according to the status information read notification, and write the status information into the memory of the first virtual machine again; and accordingly, the virtual machine migration management unit is further configured to trigger a memory iteration operation, where the memory iteration operation is used to migrate data in the memory of the first virtual machine to a second virtual machine, where the second virtual machine is a destination virtual machine to which the first virtual machine is migrated.

Optionally, that the processing unit reads the new data from the memory of the first virtual machine according to the dirty write flag, and writes the new data into the memory of the first virtual machine again according to the dirty write flag includes determining, by the processing unit, a memory page that is occupied by the new data and is in the memory of the first virtual machine, reading, according to the dirty write flag, data in the memory page occupied by the new data, and writing, according to the dirty write flag, the read data again into the memory page occupied by the new data.

Optionally, the first virtual machine further includes a notifying unit configured to notify the virtual machine migration management unit of information about a memory page occupied by the status information so that the virtual machine migration management unit notifies the second virtual machine of the information about the memory page occupied by the status information.

Optionally, the second virtual machine acquires the status information from migrated memory data according to the information about the memory page occupied by the status information; and the second virtual machine restores, according to the status information, a virtual network interface card corresponding to the destination virtual machine.

According to the virtual machine live migration method, the virtual machine memory data processing method, the server, and the virtual machine system that are provided in the embodiments of the present invention, by setting a dirty write flag, a virtual PCIE device of a to-be-migrated virtual machine performs at least one read and write operation on received data; a virtual machine manager of the to-be-migrated virtual machine can identify a change in the data and migrate changed data to a destination virtual machine, thereby resolving a problem in the prior art that data cannot be migrated during a virtual machine live migration process because the data passes through the virtual PCIE device but the virtual machine manager cannot perceive the data. In addition, a source virtual machine can write, according to a message for shutting down the source virtual machine, status information of a virtual network interface card corresponding to the source virtual machine into a memory of the source virtual machine, or a to-be-migrated source virtual machine reads status information of a virtual network interface card of the source virtual machine from a memory of the source virtual machine according to a status information read notification sent by a physical network interface card and writes the status information into the memory of the source virtual machine again, thereby implementing status migration of a virtual network interface card during a virtual machine migration process.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

To resolve a problem in the prior art that live migration of a virtual machine cannot be implemented in an SR-IOV technology scenario, an embodiment of the present invention discloses a virtual machine live migration method.

Figure 1:
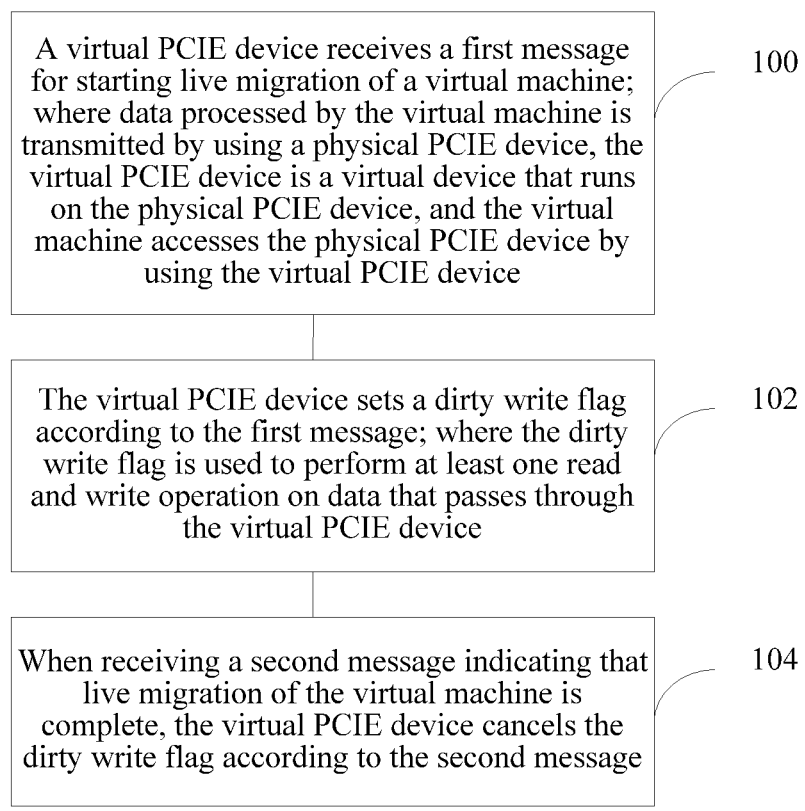
FIG. 1 is a schematic flowchart of a virtual machine live migration method according to an embodiment of the present invention.

Referring to FIG. 1, FIG. 1 is a schematic flowchart of a virtual machine live migration method according to an embodiment of the present invention, where the method includes the following steps.

Step 100: A virtual PCIE device receives a first message for starting live migration of a virtual machine; where data processed by the virtual machine is transmitted using a physical PCIE device, the virtual PCIE device is a virtual device that runs on the physical PCIE device, and the virtual machine accesses the physical PCIE device using the virtual PCIE device.

Step 102: The virtual PCIE device sets a dirty write flag according to the first message; where the dirty write flag is used to perform at least one read and write operation on data that passes through the virtual PCIE device.

Step 104: When receiving a second message indicating that live migration of the virtual machine is complete, the virtual PCIE device cancels the dirty write flag according to the second message.

By setting a dirty write flag in the foregoing, a virtual PCIE device of a to-be-migrated virtual machine performs at least one read and write operation on received data, a virtual machine manager of the to-be-migrated virtual machine can identify a change in the data and migrate changed data to a destination virtual machine, thereby resolving a problem in the prior art that data cannot be migrated during a virtual machine live migration process because the data passes through the virtual PCIE device but the virtual machine manager cannot perceive the data.

As an optional implementation manner, before step 100, the virtual machine live migration method in this embodiment of the present invention further includes establishing a message channel between the virtual PCIE device and the physical PCIE device, to receive the first message for starting live migration of a virtual machine.

The message channel between the virtual PCIE device and the physical PCIE device may be established in the following manner: establishing a message channel between a driver of the virtual PCIE device and a driver of the physical PCIE device, that is, separately reserving a segment of data space in the driver of the virtual PCIE device and the driver of the physical PCIE device, and implementing message transfer using the reserved data space.

That a message is transferred between the virtual PCIE device and the physical PCIE device using the reserved data space may be implemented in the following two manners: transferring, by a network interface card of the virtual machine, a message within the reserved data space in a DMA manner, to implement message communication between the virtual PCIE device and the physical PCIE device; or reserving, on a network interface card of the virtual machine, data space used for communication, and separately sharing the reserved data space with the virtual PCIE device and the physical PCIE device.

The network interface card of the virtual machine is a physical network interface card used by the virtual machine.

Message transfer between the physical PCIE device and the virtual PCIE device may be implemented in the following manner.

The physical PCIE device writes a message that is to be sent to the virtual PCIE device into data space of the physical PCIE device, where the message carries an address of a source physical PCIE device and an address of a destination virtual PCIE device; and when detecting a new message in the data space, the network interface card migrates the message to data space of a corresponding virtual PCIE device according to the address of the destination virtual PCIE device, and instructs the virtual PCIE device to acquire the message. The corresponding virtual PCIE device acquires the message from the data space of the corresponding virtual PCIE device.

Optionally, the message channel established between the virtual PCIE device and the physical PCIE device is created by the virtual machine manager of the virtual machine or a virtual machine migration management module.

In the foregoing step 100, it may be that the virtual machine migration management module delivers the first message for starting live migration of a virtual machine to the physical PCIE device, and the physical PCIE device sends the first message to the virtual PCIE device through the foregoing established message channel. In step 102 of this embodiment of the present invention, the dirty write flag set by the virtual PCIE device may be set within data space reserved in the driver of the virtual PCIE device, or an independent variable may be set as the dirty write flag. The dirty write flag may be set by the driver of the virtual PCIE device.

After the virtual PCIE device sets the dirty write flag, the virtual PCIE device performs at least one read and write operation on received data, for example, a read and write operation of one byte. In this way, the virtual machine manager of the virtual machine can identify that the data has been modified, and the data can be migrated during live migration of the virtual machine.

The virtual machine migration management module starts memory iterative copy of virtual machine live migration, and to achieve a better effect of virtual machine live migration, another segment of data space may be further reserved in the drivers of the virtual PCIE device and the physical PCIE device separately, and this another portion of data space is used to store status data between the network interface card and a corresponding virtual PCIE device, where the status data is used to restore the status data in a destination virtual machine after the virtual machine is migrated and implement seamless switching of a virtual machine state.

Before the foregoing step 104, the virtual machine live migration method in this embodiment of the present invention further includes, when a last round of iterative copy of virtual machine live migration is complete, delivering, by the virtual machine migration management module, a message to the network interface card and the corresponding virtual PCIE device using the physical PCIE device, and stopping receiving and sending data; after receiving the message, stopping, by the network interface card, data receiving and sending for the virtual PCIE device; and writing, by the virtual PCIE device, a page dirty according to the set dirty write flag, where all data received by the network interface card before stopping receiving data is located in the page. In this way, migration of all the data can be implemented, and accuracy of virtual machine live migration is improved. Optionally, if there is data of another variable that is modified by means of DMA, a page in which the data is located is also written dirty according to the set dirty write flag.

When virtual machine migration is complete and the destination virtual machine is to be started, the virtual machine migration management module delivers, using a physical PCIE device of a destination server, a start message for starting the destination virtual machine to the network interface card so that the network interface card sends the foregoing stored status data between the network interface card and the corresponding virtual PCIE device to a virtual PCIE device corresponding to the destination virtual machine in a DMA manner, to implement switching of the virtual machine state from a source virtual machine to a destination virtual machine.

After the virtual machine migration is complete, the virtual machine migration management module sends a second message indicating that the migration is complete to the virtual PCIE device of the virtual machine, to cancel the dirty write flag.

Figure 2:
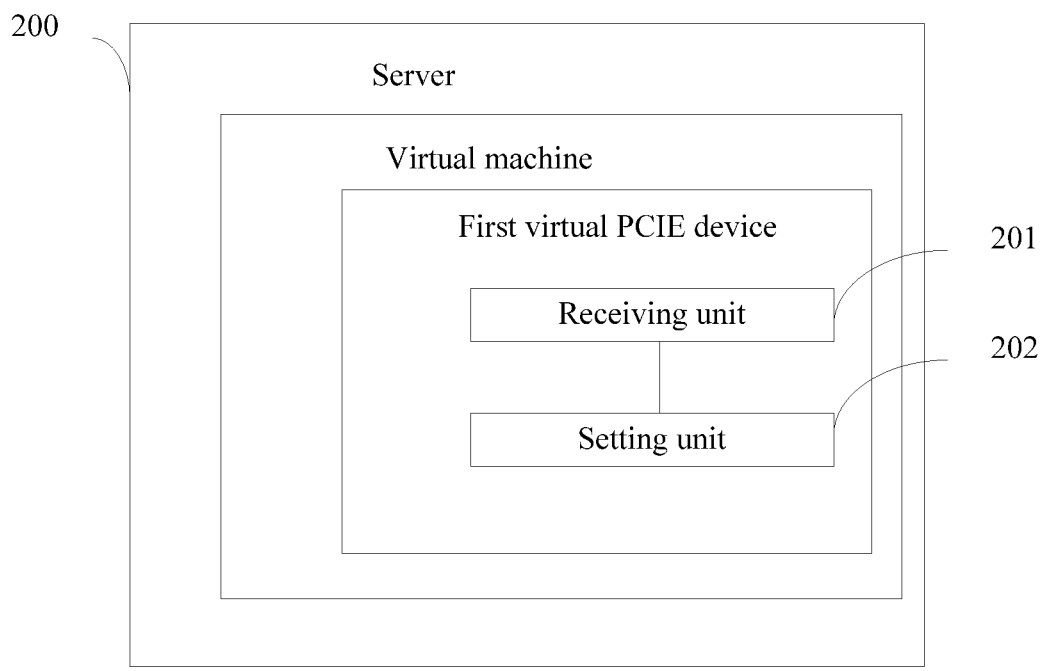
FIG. 2 is a schematic structural diagram of a server 200 according to an embodiment of the present invention.

An embodiment of the present invention further provides a server, and an SR-IOV technology is used to implement virtualization on a virtual machine that runs on the server. Referring to FIG. 2, FIG. 2 is a schematic structural diagram of a server 200 according to an embodiment of the present invention.

At least one virtual machine runs on the server 200, data processed by the at least one virtual machine is transmitted using a physical PCIE device, at least one virtual PCIE device runs on the physical PCIE device, and each virtual machine corresponds to one virtual PCIE device; where a first virtual PCIE device among the at least one virtual PCIE device includes a receiving unit 201 configured to receive a first message of virtual machine live start migration corresponding to the first virtual PCIE device; and a setting unit 202 configured to set a dirty write flag according to the first message, where the dirty write flag is used to perform at least one read and write operation on data that passes through the first virtual PCIE device; and when receiving a second message indicating that live migration of the virtual machine corresponding to the first virtual PCIE device is complete, cancel the dirty write flag according to the second message.

By setting the dirty write flag by the setting unit 202 in the foregoing, a first virtual PCIE device of a to-be-migrated virtual machine performs at least one read and write operation on received data, a virtual machine manager of the to-be-migrated virtual machine can identify a change in the data and migrate changed data to a destination virtual machine, thereby resolving a problem in the prior art that data cannot be migrated during a virtual machine live migration process because the data passes through the virtual PCIE device but the virtual machine manager cannot perceive the data.

The setting unit 202 setting the dirty write flag according to the first message may include setting, by the setting unit, the dirty write flag according to the first message using a driver of the first virtual PCIE device; or setting, by the setting unit, an independent variable as the dirty write flag.

The setting, by the setting unit 202, the dirty write flag using a driver may include setting, by the setting unit, the dirty write flag within data space reserved in the driver of the first virtual PCIE device.

Figure 3:
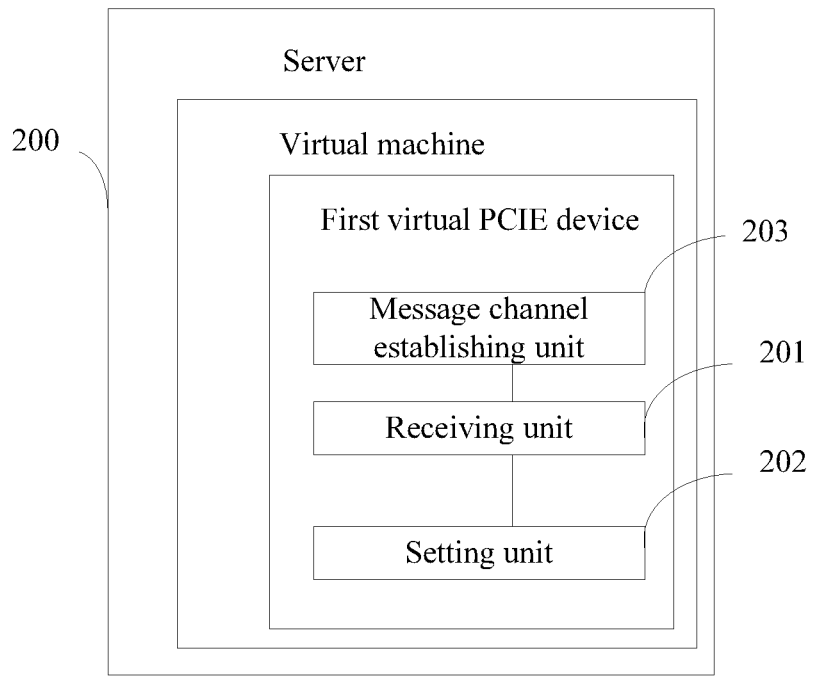
FIG. 3 is a schematic structural diagram of another implementation manner of a server 200 according to an embodiment of the present invention.

As an optional implementation manner, the first virtual PCIE device further includes a message channel establishing unit 203. Referring to FIG. 3, FIG. 3 is a schematic structural diagram of another implementation manner of a server according to an embodiment of the present invention.

The message channel establishing unit 203 is configured to establish a message channel between the first virtual PCIE device and the physical PCIE device so that the receiving unit 201 receives, through the established message channel, the first message for starting live migration of a virtual machine corresponding to the first virtual PCIE device.

As an optional implementation manner, that the message channel establishing unit 203 establishes the message channel between the first virtual PCIE device and the physical PCIE device includes separately reserving, by the message channel establishing unit 203, a segment of data space in the driver of the first virtual PCIE device and a driver of the physical PCIE device, and implementing message transfer between the first virtual PCIE device and the physical PCIE device using the reserved data space.

Accordingly, that the first virtual PCIE device and the physical PCIE device implement message transfer using the reserved data space includes transferring, by a network interface card of the virtual machine, a message within the reserved data space in a direct memory access DMA manner, to implement message communication between the first virtual PCIE device and the physical PCIE device; or reserving, by the message channel establishing unit on a network interface card of the virtual machine, data space used for communication, and separately sharing the reserved data space with the virtual PCIE device and the physical PCIE device.

For an implementation manner of the virtual PCIE device in the foregoing server 200 in this embodiment of the present invention, refer to an implementation manner of the method in FIG. 1 for implementation, and details are not described again.

Based on the foregoing method for implementing virtual machine live migration in this embodiment of the present invention, an embodiment of the present invention further provides a virtual machine memory data processing method and a virtual machine migration method that are based on the foregoing method. Further introduction is provided in the following.

Before the method in this embodiment of the present invention is introduced, a system architecture of this embodiment of the present invention is further described as follows.

Figure 4:
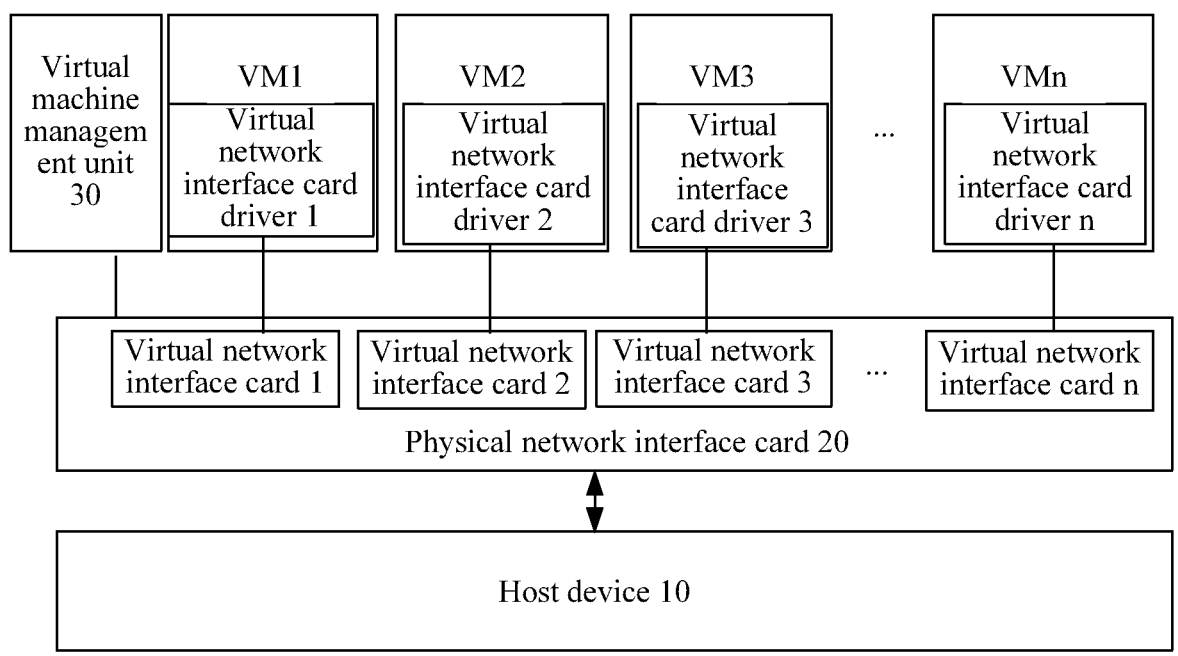
FIG. 4 is a structural diagram of a virtual machine system according to an embodiment of the present invention.

Referring to FIG. 4, FIG. 4 is a schematic structural diagram of a virtual machine (VM) system according to an embodiment of the present invention. The virtual machine system includes a host device 10, a physical network interface card 20, and a virtual machine migration management unit 30, where the host device 10 and the physical network interface card 20 are connected using an interface, n virtual machines (n is greater than or equal to 1) run on the host device 10, n virtual network interface cards are created, by means of virtualization, on the physical network interface card 20, each virtual network interface card corresponds to one virtual machine, a virtual network interface card driver corresponding to a virtual network interface card runs on each virtual machine, a virtual network interface card driver of each virtual machine is used to acquire a memory address of each virtual machine, and notify the physical network interface card 20 of the memory address of each virtual machine using a virtual network interface card corresponding to each virtual machine, and the physical network interface card 20 saves the memory address of each virtual machine. For example, a virtual network interface card driver 1 of a virtual machine VM1 is connected to a virtual network interface card 1, the virtual network interface card driver of the virtual machine VM1 acquires a memory address of the virtual machine VM1, and notifies the physical network interface card 20 of the memory address of the virtual machine VM1 using the virtual network interface card 1, and the physical network interface card 20 saves the memory address of the virtual machine VM1. Specific implementation of the foregoing physical network interface card 20 may be the physical PCIE device in the foregoing embodiment of the present invention, and the foregoing virtual network interface card may specifically correspond to the virtual PCIe device in the foregoing embodiment of the present invention. (In this embodiment, a virtual network interface card and a driver of the virtual network interface card are listed separately, the virtual network interface card is provided by the physical network interface card 20, and the driver corresponding to the virtual network interface card is accordingly loaded on the virtual machine, and the virtual PCIe device in the foregoing embodiment is a relatively broad concept and includes the virtual PCIe device and a driver corresponding to the virtual PCIe device. A person skilled in the art should understand that in the solution of this embodiment of the present invention, the foregoing differences are only differences in description.)

After the virtual network interface card of each virtual machine receives a packet, the physical network interface card 20 reads and writes data in a memory of each virtual machine according to the memory address of each virtual machine, using the interface between the host device and the physical network interface card, and in a direct memory access DMA manner. That is, the physical network interface card 20 directly reads the data in the memory of each virtual machine from the host device 10, or directly writes data into the memory of each virtual machine by writing data to the host device 10. For example, after the virtual network interface card 1 receives a packet sent or received by the virtual machine VM1, the physical network interface card 20 reads data in a memory of the VM1 according to the saved memory address of the virtual machine VM1, using the interface between the host device 10 and the physical network interface card 20, and in a DMA manner, or writes, in a DMA manner, packet data received by the virtual network interface card 1 into a memory of the virtual machine VM1.

As an optional implementation manner, a virtual machine (such as VM1 or VM2) shown in FIG. 4 may include an operating system that runs on the virtual machine, an application that runs on the virtual machine, a virtual network interface card driver that runs on the virtual machine, and the like.

In FIG. 4, the host device 10 is a device that includes a central processing unit (CPU), a memory, a hard disk, and the like, and the virtual machine is a virtual device created, by means of virtualization, from the host device 10. As shown in FIG. 4, the host device 10 is separated from the virtual machine (VM1 or VM2) and the like, to clearly display a connection relationship among the virtual machine, a network interface card, and the host device, and does not indicate that the host device 10 is separated from the virtual machine.

The virtual machine system in this embodiment of the present invention includes a virtual machine migration management unit, a host device, and a physical network interface card. For example, in FIG. 4, the virtual machine system includes the virtual machine migration management unit 30, the host device 10, and the physical network interface card 20.

In FIG. 4, the virtual machine migration management unit 30 runs on the host device and is implemented as a software module. However, in another specific implementation of this embodiment of the present invention, the virtual machine migration management unit 30 may also be directly implemented by a server that has a management function. A person skilled in the art may also use another implementation manner, for example, use a virtual machine to implement the virtual machine migration management unit, which is not limited in this embodiment of the present invention.

Figure 5:
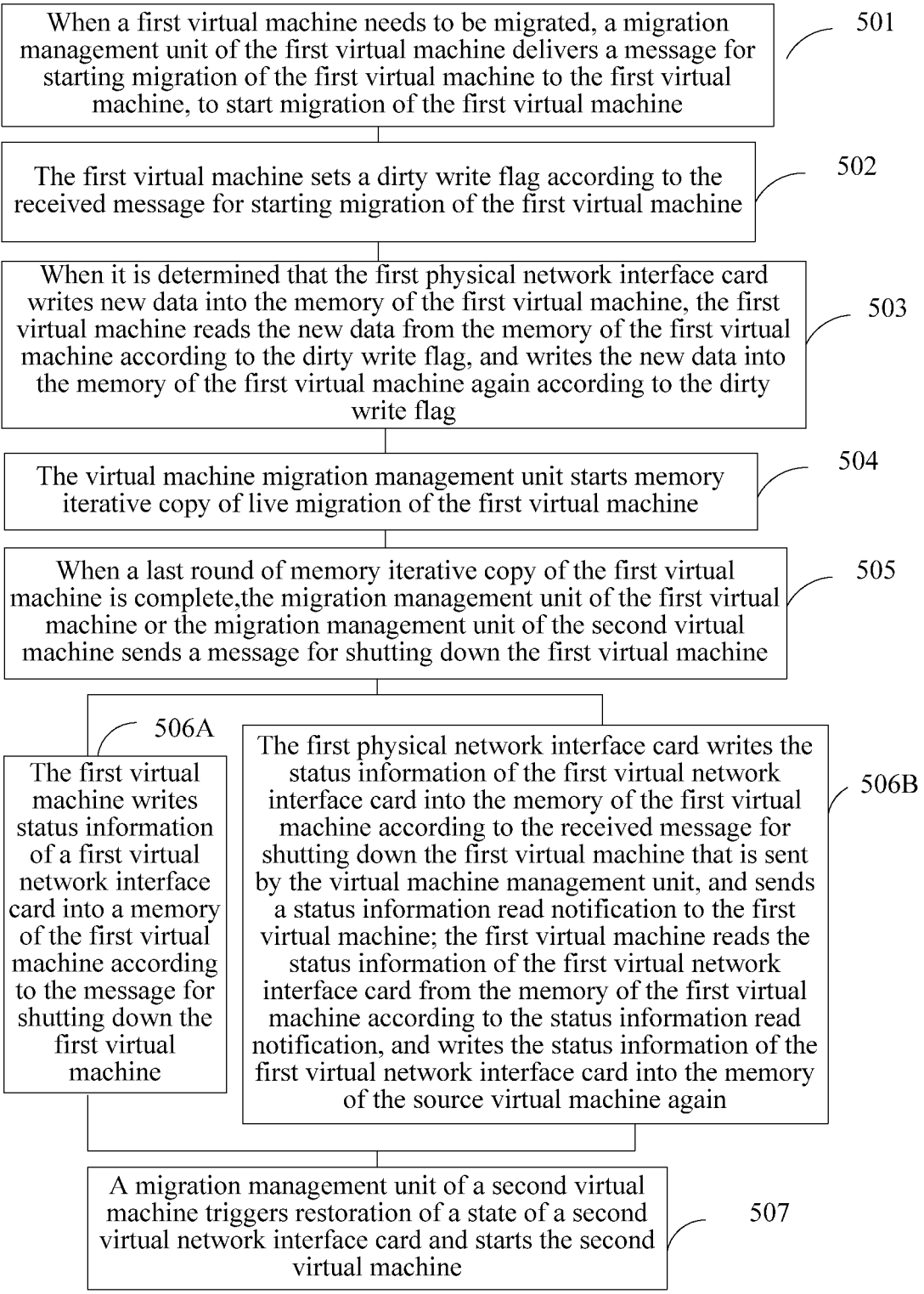
FIG. 5 is a schematic flowchart of a virtual machine migration method according to an embodiment of the present invention.

When a virtual machine in a virtual machine system is migrated to another virtual machine, which, for example, is shown in FIG. 5 (in a virtual machine system in which a method shown in FIG. 5 runs, there may be multiple virtual machine migration management units, and a virtual machine migration management unit of a to-be-migrated source virtual machine and a virtual machine migration management unit of a destination virtual machine are different units, and in another embodiment, a source virtual machine and a destination virtual machine may have a same virtual machine migration management unit), when a first virtual machine (the source virtual machine) needs to be migrated to a second virtual machine (the destination virtual machine), a physical network interface card reads and writes data in a memory of each virtual machine in a direct memory access manner, and the first virtual machine or a manager of the first virtual machine is not required for reading and writing data in a memory of the first virtual machine. Therefore, when live migration of the first virtual machine is started, data in memory data of the first virtual machine that is changed after the first virtual machine is migrated cannot be migrated to the second virtual machine in a memory iterative manner. To resolve this problem, an embodiment of the present invention provides a virtual machine migration method. As shown in FIG. 5, the method includes the following steps.

Step 501: When a first virtual machine is migrated, a migration management unit of the first virtual machine delivers a message for starting migration of the first virtual machine to the first virtual machine, to start migration of the first virtual machine.

That a migration management unit of the first virtual machine delivers a message for starting migration of the first virtual machine to the first virtual machine may be implemented in the following manners.

Manner 1: One message receiving and sending buffer is configured for a driver of a first virtual network interface card of the first virtual machine and a driver of a first physical network interface card separately, and the migration management unit of the first virtual machine sends a packet message to a buffer of the driver of the first physical network interface card, where the packet message has a source address and a destination address, the destination address is an address of the first virtual network interface card, the driver of the first physical network interface card reads data from a sending buffer by means of DMA and writes the message to the buffer of the driver of the first virtual network interface card by means of DMA according to the destination address of the packet message, and instructs, using an interrupt, the driver of the first virtual network interface card to perform message processing.

Manner 2: One message receiving and sending register is configured for a driver of a first physical network interface card and a driver of a first virtual network interface card of the first virtual machine separately, and when sending a message, the migration management unit of the first virtual machine writes a packet message into a message register of the driver of the first physical network interface card, where the packet message has a source address and a destination address, the destination address is the first virtual network interface card, after detecting that the message is written, the driver of the first physical network interface card migrates the message to a message register of the driver of the first virtual network interface card according to the destination address of the message, and instructs, using an interrupt, the driver of the first virtual network interface card to perform message processing.

Step 502: The first virtual machine sets a dirty write flag according to the received message for starting migration of the first virtual machine.

In this embodiment of the present invention, setting the dirty write flag may be implemented in multiple manners. For example, the dirty write flag is set within reserved space in the driver of the first virtual network interface card, or is set in a chip corresponding to the first virtual network interface card, or is set using an independent variable, or the like. In this embodiment of the present invention, a storage location of the dirty write flag is not limited, as long as the first virtual machine can acquire the dirty write flag. The dirty write flag may also be referred to as a dirty write identifier, and is used to indicate that reprocessing needs to be performed by the first virtual machine on some data in the memory of the first virtual machine so that the first virtual machine can learn this part of data, where the reprocessing may be an operation that the first virtual machine reads this part of data from the memory and then writes this part of data into the memory again.

Step 503: When it is determined that the first physical network interface card writes new data into the memory of the first virtual machine, the first virtual machine reads the new data from the memory of the first virtual machine according to the dirty write flag, and writes the new data into the memory of the first virtual machine again according to the dirty write flag.

In this embodiment of the present invention, there may be multiple manners for the first virtual machine to determine that the first physical network interface card writes new data into the memory of the first virtual machine, for example, using a received interrupt notification sent by the first physical network interface card.

In this embodiment of the present invention, that the first virtual machine reads the new data from the memory of the first virtual machine and writes the new data into the memory of the first virtual machine again includes performing, by the first virtual machine, at least one read and write operation on the memory of the first virtual machine by page; or performing, by the first virtual machine, at least one read and write operation on the memory of the first virtual machine by block. The at least one read and write operation may be performing at least one operation of reading and writing on data of one bit.

Step 504: The migration management unit of the first virtual machine or a migration management unit of a second virtual machine starts memory iterative copy of live migration of the first virtual machine.

That is, the data in the memory of the first virtual machine is migrated to the second virtual machine.

Step 505: When a last round of memory iterative copy of the first virtual machine is complete, the migration management unit of the first virtual machine or the migration management unit of the second virtual machine sends a message for shutting down the first virtual machine, where the message for shutting down the first virtual machine is sent to the first virtual machine or the first physical network interface card; if the message for shutting down the first virtual machine is sent to the first virtual machine, step 506A is executed; if the message for shutting down the first virtual machine is sent to the first physical network interface card, step 506B is executed.

In this embodiment of the present invention, the message for shutting down the first virtual machine is triggered only when the last round of memory iterative copy of the first virtual machine is complete. In another embodiment, when this message for shutting down the first virtual machine is triggered may also be flexibly determined.

The message for shutting down the first virtual machine is a new message, is mainly used to instruct the first virtual network interface card to stop working or stop receiving and sending a packet, and indicates that migration of the first virtual machine enters another stage, which may be implemented by a person skilled in the art in various manners in which a message name is only an example.

Step 506A: The first virtual machine writes status information of the first virtual network interface card into a memory of the first virtual machine according to the message for shutting down the first virtual machine.

The status information of the first virtual network interface card includes but is not limited to a restoration counter, a register, a buffer pointer, context, a DMA state, and the like, and the status information is stored on the first physical network interface card.

In this embodiment of the present invention, because the first virtual network interface card runs on the first physical network interface card, and the status information of the first virtual network interface card is also saved in a storage medium of the first physical network interface card, to implement successful migration of the first virtual machine, the status information of the first virtual network interface card also needs to be migrated to a side of the second virtual machine so that a second virtual network interface card resumes working. Therefore, in this embodiment of the present invention, after the message for shutting down the first virtual machine is sent, the status information of the first virtual network interface card is written into the memory of the first virtual machine so that the status information can be migrated to the side of the second virtual machine together with other memory data of the first virtual machine, to finally ensure successful migration of the first virtual machine.

Step 506B: The first physical network interface card writes status information of the first virtual network interface card into the memory of the first virtual machine according to the received message for shutting down the first virtual machine that is sent by the migration management unit of the first or second virtual machine, and sends a status information read notification to the first virtual machine; the first virtual machine reads the status information of the first virtual network interface card from the memory of the first virtual machine according to the status information read notification, and writes the status information of the first virtual network interface card into the memory of the source virtual machine again.

Step 507: The migration management unit of the second virtual machine triggers restoration of a state of the second virtual network interface card and starts the second virtual machine.

A state to which the second virtual network interface card is to be restored is a state of the first virtual network interface card before the first virtual machine is migrated. Because the state of the first virtual network interface card is saved in the memory of the first virtual machine after the first virtual machine stops receiving and sending data, and is migrated to a memory of the second virtual machine, restoration of a state of the second virtual network interface card corresponding to the second virtual machine can be implemented.

As an optional implementation manner, in this embodiment of the present invention, that the migration management unit of the second virtual machine triggers restoration of a state of the second virtual network interface card may include sending, by the migration management unit of the first virtual machine, a location that is in the memory of the first virtual machine and is of the status information of the first virtual network interface card to the second virtual machine, and acquiring, by the second virtual machine, the status information from the memory of the second virtual machine according to a memory address occupied by the status information; or sending, by the migration management unit of the first virtual machine, a location that is in the memory of the first virtual machine and is of the status information of the first virtual network interface card to a driver of the second virtual network interface card so that the driver of the second virtual network interface card acquires the status information that is in the memory of the second virtual machine and is of the first virtual network interface card, and performs status restoration, where the driver of the second virtual network interface card is an interface between the first virtual machine and the second virtual network interface card; or instructing, by the migration management unit of the second virtual machine, the second virtual machine to restore the status information of the first virtual network interface card to a chip of the second physical network interface card, and instructing the driver of the second virtual network interface card to acquire the state of the first virtual network interface card from the chip, to restore the state of the second virtual network interface card.

As an optional implementation manner, the second virtual machine may be started after the state of the second virtual network interface card is restored, or may be started first and then the state of the second virtual network interface card is restored, and a sequence is not limited in this embodiment of the present invention.

It should be noted that, in this embodiment of the present invention, the dirty write flag is used to perform at least one read and write operation on virtual machine memory data that needs to be migrated, to implement effective migration of the virtual machine memory data during a virtual machine migration process. After migration of the first virtual machine is complete, the dirty write flag may be canceled. For example, the first virtual machine may clear the dirty write flag after step 505 is complete; or in step 507, the second virtual machine clears the dirty write flag when the first virtual machine is migrated to the second virtual machine.

In the foregoing virtual machine migration method, processing of the virtual machine memory data is key implementation in this embodiment of the present invention, and this embodiment of the present invention also provides corresponding virtual machine memory data processing methods.

A first virtual machine memory processing method in this embodiment of the present invention is as follows.

The virtual machine memory processing method in this embodiment of the present invention is applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

When any virtual machine in the virtual machine system is migrated, the method includes:

S1: A to-be-migrated source virtual machine receives a message for starting virtual machine migration that is sent by the virtual machine migration management unit.

S2: The source virtual machine sets a dirty write flag according to the message for starting virtual machine migration.

S3: When it is determined that the physical network interface card writes new data into a memory of the source virtual machine, the source virtual machine reads the new data from the memory of the source virtual machine according to the dirty write flag, and writes the new data into the memory of the source virtual machine again according to the dirty write flag.

In the foregoing method, by setting a dirty write flag, when it is determined that the physical network interface card writes new data into the memory of the source virtual machine, the new data is read from the memory of the source virtual machine, and the new data is written into the memory of the source virtual machine again so that a virtual machine migration management unit of the to-be-migrated source virtual machine can identify a change in the data and migrate changed data to a destination virtual machine, thereby resolving a problem in the prior art that data cannot be migrated during a virtual machine migration process because the virtual machine migration management unit cannot perceive the data.

During a specific implementation process, the first virtual machine memory processing method in this embodiment of the present invention may further include:

S4A: The source virtual machine receives a message for shutting down the source virtual machine that is sent by the virtual machine migration management unit.

The source virtual machine writes, according to the message for shutting down the source virtual machine, status information of a virtual network interface card corresponding to the source virtual machine into the memory of the source virtual machine.

Alternatively, the first virtual machine memory processing method in this embodiment of the present invention may further include:

S4B: The source virtual machine receives a status information read notification sent by the physical network interface card, where the physical network interface card sends the status information read notification after writing, according to a received message for shutting down the source virtual machine that is sent by the virtual machine migration management unit, status information of a virtual network interface card corresponding to the source virtual machine into the memory of the source virtual machine.

The source virtual machine reads the status information of the virtual network interface card of the source virtual machine from the memory of the source virtual machine according to the status information read notification, and writes the status information into the memory of the source virtual machine again.

S4A or step S4B in the foregoing method depends on whether the virtual machine migration management unit notifies the virtual machine or the physical network interface card of the message for shutting down the virtual machine. Both of the two implementation manners can enable the status information of the virtual network interface card of the source virtual machine to be written into the memory of the source virtual machine so that the status information of the virtual network interface card of the source virtual machine can also be migrated to the destination virtual machine together with the source virtual machine, thereby implementing migration of a state of a virtual network interface card of a virtual machine.

S5: The source virtual machine clears the dirty write flag.

Optionally, in the foregoing step S3, that the source virtual machine reads the new data from the memory of the source virtual machine according to the dirty write flag, and writes the new data into the memory of the source virtual machine again according to the dirty write flag may include determining, by the source virtual machine, a memory page that is occupied by the new data and is in the memory of the source virtual machine, reading data in the memory page according to the dirty write flag, and writing the read data into the memory page again according to the dirty write flag.

Optionally, in the foregoing step S1, that a source virtual machine receives a message for starting virtual machine migration that is sent by the virtual machine migration management unit may include reading, by a driver of the virtual network interface card in the source virtual machine, a buffer or a register on the virtual network interface card of the source virtual machine, and acquiring the message for starting virtual machine migration that is directly written into the buffer or the register by the virtual machine migration management unit.

A second virtual machine memory processing method in this embodiment of the present invention is as follows.

The second virtual machine memory data processing method is applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

When any virtual machine in the virtual machine system is migrated, the method includes:

S1: A to-be-migrated source virtual machine receives a message for shutting down the source virtual machine that is sent by the virtual machine migration management unit.

S2: The source virtual machine writes, according to the message for shutting down the source virtual machine, status information of a virtual network interface card corresponding to the source virtual machine into a memory of the source virtual machine.

Using the foregoing method, the status information of the virtual network interface card of the source virtual machine can be written into the memory of the source virtual machine so that the status information of the virtual network interface card of the source virtual machine can also be migrated to a destination virtual machine together with the source virtual machine, thereby implementing migration of a state of a virtual network interface card of a virtual machine.

During a specific implementation process, before the receiving a message for shutting down the source virtual machine, the second virtual machine memory processing method in this embodiment of the present invention may further include:

S0: The source virtual machine receives a message for starting virtual machine migration that is sent by the virtual machine migration management unit.

The source virtual machine sets a dirty write flag according to the message for starting virtual machine migration.

When it is determined that the physical network interface card writes new data into the memory of the source virtual machine, the source virtual machine reads the new data from the memory of the source virtual machine according to the dirty write flag, and writes the new data into the memory of the source virtual machine again according to the dirty write flag.

By setting a dirty write flag in the foregoing, when it is determined that the physical network interface card writes new data into the memory of the source virtual machine, the new data is read from the memory of the source virtual machine, and the new data is written into the memory of the source virtual machine again so that a virtual machine migration management unit of the to-be-migrated source virtual machine can identify a change in the data and migrate changed data to a destination virtual machine, thereby resolving a problem in the prior art that data cannot be migrated during a virtual machine migration process because the virtual machine migration management unit cannot perceive the data.

S3: The source virtual machine clears the dirty write flag.

A specific implementation manner and an implementation sequence of S0 or S3 may be flexible, and may be flexibly determined by a person skilled in the art according to the foregoing other embodiments of the present invention.

As an optional implementation manner, in the foregoing step S0, that the source virtual machine reads the new data from the memory of the source virtual machine according to the dirty write flag, and writes the new data into the memory of the source virtual machine again according to the dirty write flag includes determining, by the source virtual machine, a memory page that is occupied by the new data and is in the memory of the source virtual machine, reading data in the memory page according to the dirty write flag, and writing the read data into the memory page again according to the dirty write flag.

A third virtual machine memory processing method in this embodiment of the present invention is as follows: the third virtual machine memory processing method in this embodiment of the present invention is applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

When any virtual machine in the virtual machine system is migrated, the method includes:

S1: A to-be-migrated source virtual machine receives a status information read notification sent by the physical network interface card, where the physical network interface card sends the status information read notification after writing, according to a received message for shutting down the source virtual machine that is sent by the virtual machine migration management unit, status information of a virtual network interface card corresponding to the source virtual machine into a memory of the source virtual machine.

S2: The source virtual machine reads the status information of the virtual network interface card of the source virtual machine from the memory of the source virtual machine according to the status information read notification, and writes the status information into the memory of the source virtual machine again.

Using the foregoing method, the status information of the virtual network interface card of the source virtual machine can be written into the memory of the source virtual machine so that the status information of the virtual network interface card of the source virtual machine can also be migrated to a destination virtual machine together with the source virtual machine, thereby implementing migration of a state of a virtual network interface card of a virtual machine.

During a specific implementation process, the third virtual machine memory processing method in this embodiment of the present invention may further include:

S0: The source virtual machine receives a message for starting virtual machine migration that is sent by the virtual machine migration management unit; the source virtual machine sets a dirty write flag according to the message for starting virtual machine migration; and when it is determined that the physical network interface card writes new data into the memory of the source virtual machine, the source virtual machine reads the new data from the memory of the source virtual machine according to the dirty write flag, and writes the new data into the memory of the source virtual machine again according to the dirty write flag.

S3: The source virtual machine clears the dirty write flag.

A specific implementation manner and an implementation sequence of S0 or S3 may be flexible, and may be flexibly determined by a person skilled in the art according to the foregoing other embodiments of the present invention.

As an optional implementation manner, in the foregoing step S0, that the source virtual machine reads the new data from the memory of the source virtual machine according to the dirty write flag, and writes the new data into the memory of the source virtual machine again according to the dirty write flag includes determining, by the source virtual machine, a memory page that is occupied by the new data and is in the memory of the source virtual machine, reading data in the memory page according to the dirty write flag, and writing the read data into the memory page again according to the dirty write flag.

Based on the foregoing virtual machine memory data processing method, an embodiment of the present invention further provides two virtual machine migration methods. The virtual machine migration methods in this embodiment of the present invention are applied to a virtual machine system, where the virtual machine system includes a virtual machine migration management unit, a host device, and a physical network interface card; at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

The method includes:

S1: A to-be-migrated source virtual machine receives a message for starting virtual machine migration that is sent by the virtual machine migration management unit.

S2: The source virtual machine sets a dirty write flag according to the message for starting virtual machine migration.

S3: When it is determined that the physical network interface card writes new data into a memory of the source virtual machine, the source virtual machine reads the new data from the memory of the source virtual machine according to the dirty write flag, and writes the new data into the memory of the source virtual machine again according to the dirty write flag.

S4: The source virtual machine receives a message for shutting down the source virtual machine that is sent by the virtual machine migration management unit.

S5: The source virtual machine writes, according to the message for shutting down the source virtual machine, status information of a virtual network interface card corresponding to the source virtual machine into the memory of the source virtual machine.

S6: The virtual machine migration management unit triggers a memory iteration operation, where the memory iteration operation is used to migrate data in the memory of the source virtual machine to a destination virtual machine.

In the foregoing method, by setting a dirty write flag, when it is determined that the physical network interface card writes new data into the memory of the source virtual machine, the new data is read from the memory of the source virtual machine, and the new data is written into the memory of the source virtual machine again so that a virtual machine migration management unit of the to-be-migrated source virtual machine can identify a change in the data and migrate changed data to a destination virtual machine, thereby resolving a problem in the prior art that data cannot be migrated during a virtual machine migration process because the virtual machine migration management unit cannot perceive the data. In addition, the source virtual machine writes, according to the message for shutting down the source virtual machine, the status information of the virtual network interface card corresponding to the source virtual machine into the memory of the source virtual machine, which can enable the status information of the virtual network interface card of the source virtual machine to be written into the memory of the source virtual machine so that the status information of the virtual network interface card of the source virtual machine can also be migrated to the destination virtual machine together with the source virtual machine, thereby implementing migration of a state of a virtual network interface card of a virtual machine.

During a specific implementation process, the method in this embodiment of the present invention may further include:

S7: The source virtual machine notifies the virtual machine migration management unit of a memory address occupied by the status information so that the virtual machine migration management unit notifies the destination virtual machine of the memory address occupied by the status information.

S8: The destination virtual machine acquires the status information from migrated memory data according to the memory address occupied by the status information.

The destination virtual machine restores, according to the status information, a virtual network interface card corresponding to the destination virtual machine.

Another virtual machine migration method in this embodiment of the present invention is applied to a virtual machine system, where the virtual machine system includes a virtual machine migration management unit, a physical device, and a network interface card; at least one virtual machine runs on the physical device, at least one virtual network interface card runs on the network interface card, each virtual machine corresponds to one virtual network interface card, and each virtual machine receives and sends a packet using a corresponding virtual network interface card.

The method includes:

S1: A to-be-migrated source virtual machine receives a message for starting virtual machine migration that is sent by the virtual machine migration management unit.

S2: The source virtual machine sets a dirty write flag according to the message for starting virtual machine migration.

S3: When it is determined that new data is written into a memory of the source virtual machine, the source virtual machine reads the new data from the memory of the source virtual machine according to the dirty write flag, and writes the new data into the memory of the source virtual machine again according to the dirty write flag.

S4: The source virtual machine receives a status information read notification sent by the network interface card, where the status information read notification is sent after the network interface card writes status information of a virtual network interface card corresponding to the source virtual machine into the memory of the source virtual machine; and the network interface card triggers, after receiving a message for shutting down the source virtual machine that is sent by the virtual machine migration management unit, a step of writing the status information into the memory of the source virtual machine.

S5: The source virtual machine reads the status information of the virtual network interface card of the source virtual machine from the memory of the source virtual machine according to the status information read notification, and writes the status information into the memory of the source virtual machine again.

S6: The virtual machine migration management unit triggers a memory iteration operation, where the memory iteration operation is used to migrate data in the memory of the source virtual machine to a destination virtual machine.

In the foregoing method, by setting a dirty write flag, when it is determined that the physical network interface card writes new data into the memory of the source virtual machine, the new data is read from the memory of the source virtual machine, and the new data is written into the memory of the source virtual machine again so that a virtual machine migration management unit of the to-be-migrated source virtual machine can identify a change in the data and migrate changed data to a destination virtual machine, thereby resolving a problem in the prior art that data cannot be migrated during a virtual machine migration process because the virtual machine migration management unit cannot perceive the data. In addition, the source virtual machine writes, according to the message for shutting down the source virtual machine, the status information of the virtual network interface card corresponding to the source virtual machine into the memory of the source virtual machine, which can enable the status information of the virtual network interface card of the source virtual machine to be written into the memory of the source virtual machine so that the status information of the virtual network interface card of the source virtual machine can also be migrated to the destination virtual machine together with the source virtual machine, thereby implementing migration of a state of a virtual network interface card of a virtual machine.

During a specific implementation process, the method may further include:

Step S7: The source virtual machine notifies the virtual machine migration management unit of information about a memory page occupied by the status information so that the virtual machine migration management unit notifies the destination virtual machine of the information about the memory page occupied by the status information.

Step S8: The destination virtual machine acquires the status information from migrated memory data according to the information about the memory page occupied by the status information; and the destination virtual machine restores, according to the status information, a virtual network interface card corresponding to the destination virtual machine.

Based on the foregoing virtual machine memory data processing methods and the virtual machine migration methods, and with reference to the structural diagram of the virtual machine system provided in FIG. 4, this embodiment of the present invention further provides five virtual machine systems, which are as follows.

A first virtual machine system is:

A virtual machine system, including a virtual machine migration management unit, a host device, and a physical network interface card; where at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

The virtual machine migration management unit is configured to send a message for starting virtual machine migration to a source virtual machine, where the source virtual machine is a to-be-migrated virtual machine.

The source virtual machine is configured to receive the message for starting virtual machine migration that is sent by the virtual machine migration management unit, set a dirty write flag according to the message for starting virtual machine migration, and when it is determined that the physical network interface card writes new data into a memory of the source virtual machine, read the new data from the memory of the source virtual machine according to the dirty write flag, and write the new data into the memory of the source virtual machine again according to the dirty write flag.

Further, the virtual machine migration management unit is configured to send a message for shutting down the source virtual machine to the source virtual machine; and the source virtual machine is configured to receive the message for shutting down the source virtual machine that is sent by the virtual machine migration management unit, and write status information of a virtual network interface card corresponding to the source virtual machine into the memory of the source virtual machine according to the message for shutting down the source virtual machine.

Further, the virtual machine migration management unit is configured to send the message for shutting down the source virtual machine to the physical network interface card.

The physical network interface card is configured to write, according to the received message for shutting down the source virtual machine, the status information of the virtual network interface card corresponding to the source virtual machine into the memory of the source virtual machine, and send a status information read notification to the source virtual machine.

The source virtual machine is further configured to receive the status information read notification sent by the physical network interface card, read the status information of the virtual network interface card of the source virtual machine from the memory of the source virtual machine according to the status information read notification, and write the status information into the memory of the source virtual machine again.

Preferably, the source virtual machine is configured to determine a memory page that is occupied by the new data and is in the memory of the source virtual machine, read data in the memory page according to the dirty write flag, and write the read data into the memory page again according to the dirty write flag.

Further, the source virtual machine is configured to clear the dirty write flag.

A second virtual machine system is:

A virtual machine system, including a virtual machine migration management unit, a host device, and a physical network interface card; where at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

The virtual machine migration management unit is configured to send a message for shutting down a source virtual machine to the source virtual machine, where the source virtual machine is a to-be-migrated virtual machine; and the source virtual machine is configured to receive the message for shutting down the source virtual machine that is sent by the virtual machine migration management unit, and write, according to the message for shutting down the source virtual machine, status information of a virtual network interface card corresponding to the source virtual machine into a memory of the source virtual machine.

Further, the source virtual machine is configured to receive a message for starting virtual machine migration that is sent by the virtual machine migration management unit, and is configured to set a dirty write flag according to the message for starting virtual machine migration, and when it is determined that the physical network interface card writes new data into the memory of the source virtual machine, read the new data from the memory of the source virtual machine according to the dirty write flag, and write the new data into the memory of the source virtual machine again according to the dirty write flag.

Further, the source virtual machine is configured to clear the dirty write flag.

A third virtual machine system is:

A virtual machine system, including a virtual machine migration management unit, a host device, and a physical network interface card; where at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

The virtual machine migration management unit is configured to send a message for shutting down a source virtual machine to the physical network interface card, where the source virtual machine is a to-be-migrated virtual machine; and the physical network interface card is configured to write, according to the received message for shutting down the source virtual machine, status information of a virtual network interface card corresponding to the source virtual machine into a memory of the source virtual machine, and send a status information read notification to the source virtual machine.

The source virtual machine is configured to receive the status information read notification sent by the physical network interface card, read the status information of the virtual network interface card of the source virtual machine from the memory of the source virtual machine according to the status information read notification, and write the status information into the memory of the source virtual machine again.

Further, the source virtual machine is configured to receive a message for starting virtual machine migration that is sent by the virtual machine migration management unit, set a dirty write flag according to the message for starting virtual machine migration, and when it is determined that the physical network interface card writes new data into the memory of the source virtual machine, read the new data from the memory of the source virtual machine according to the dirty write flag, and write the new data into the memory of the source virtual machine again according to the dirty write flag.

Further, the source virtual machine is configured to clear the dirty write flag.

A fourth virtual machine system is:

A virtual machine system, including a virtual machine migration management unit, a host device, and a physical network interface card; where at least one virtual machine runs on the host device, at least one virtual network interface card runs on the physical network interface card, each virtual machine corresponds to at least one virtual network interface card, and the physical network interface card reads and writes data in a memory of each virtual machine in a direct memory access manner.

The virtual machine migration management unit is configured to send a message for starting virtual machine migration to a source virtual machine.

The source virtual machine is configured to receive the message for starting virtual machine migration that is sent by the virtual machine migration management unit, set a dirty write flag according to the message for starting virtual machine migration, and when it is determined that the physical network interface card writes new data into a memory of the source virtual machine, read the new data from the memory of the source virtual machine according to the dirty write flag, write the new data into the memory of the source virtual machine again according to the dirty write flag, receive a message for shutting down the source virtual machine that is sent by the virtual machine migration management unit, and write, according to the message for shutting down the source virtual machine, status information of a virtual network interface card corresponding to the source virtual machine into the memory of the source virtual machine.

The virtual machine migration management unit is further configured to trigger a memory iteration operation, where the memory iteration operation is used to migrate data in the memory of the source virtual machine to a destination virtual machine.

A fifth virtual machine system is:

A virtual machine system, including a virtual machine migration management unit, a physical device, and a network interface card; where at least one virtual machine runs on the physical device, at least one virtual network interface card runs on the network interface card, each virtual machine corresponds to one virtual network interface card, and each virtual machine receives and sends a packet using a corresponding virtual network interface card; and the virtual machine migration management unit is configured to send a message for starting virtual machine migration to a source virtual machine.

The source virtual machine is configured to receive the message for starting virtual machine migration that is sent by the virtual machine migration management unit, set a dirty write flag according to the message for starting virtual machine migration, and when it is determined that the network interface card writes new data into a memory of the source virtual machine, read the new data from the memory of the source virtual machine according to the dirty write flag, and write the new data into the memory of the source virtual machine again according to the dirty write flag.

The virtual machine migration management unit is further configured to send a message for shutting down the source virtual machine to the physical network interface card.

The physical network interface card is configured to write, according to the received message for shutting down the source virtual machine, status information of a virtual network interface card corresponding to the source virtual machine into the memory of the source virtual machine, and send a status information read notification to the source virtual machine.

The source virtual machine is further configured to receive the status information read notification sent by the physical network interface card, read the status information of the virtual network interface card of the source virtual machine from the memory of the source virtual machine according to the status information read notification, and write the status information into the memory of the source virtual machine again.

The virtual machine migration management unit is further configured to trigger a memory iteration operation, where the memory iteration operation is used to migrate data in the memory of the source virtual machine to a destination virtual machine.

In the foregoing fourth or fifth virtual machine system, the source virtual machine is further configured to notify the virtual machine migration management unit of a memory address occupied by the status information so that the virtual machine migration management unit notifies the destination virtual machine of the memory address occupied by the status information.

Further, the destination virtual machine acquires the status information from migrated memory data according to the memory address occupied by the status information and restores, according to the status information, a virtual network interface card corresponding to the destination virtual machine.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated to another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the purposes of the solutions of the embodiments of the present invention.

In addition, functional units in the embodiments of the present invention may be integrated to one processing unit, or each of the units may exist alone physically, or two or more units are integrated to one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method implemented by a source virtual machine, the method comprising:
receiving, from a virtual machine migration management unit, a first message for initiating a migration of the source virtual machine, wherein the source virtual machine runs on a host device and corresponds to a virtual network interface card running on a physical network interface card;

reading, according to the first message, first data from a memory of the source virtual machine, wherein the first data is written to the memory by the physical network interface card in a direct memory access manner through the virtual network interface card; and rewriting the first data to the memory of the source virtual machine to cause the virtual machine migration management unit to identify a change to data in the memory and migrate the first data from the memory of the source virtual machine to a destination virtual machine.

2. The method of claim 1, comprising:

receiving, from the virtual machine migration management unit, a second message for shutting down the source virtual machine; and writing, according to the second message, status information of the virtual network interface card to the memory.

3. The method of claim 1, further comprising:

receiving, from the physical network interface card, a status information read notification;

reading status information of the virtual network interface card from the memory according to the status information read notification; and rewriting the status information to the memory.

4. The method of claim 1, wherein reading the first data comprises reading the first data from a memory page for storing the first data in the memory, and wherein rewriting the first data to the memory comprises rewriting the first data to the memory page.

5. The method of claim 1, wherein a buffer or a register corresponding to the virtual network interface card stores the first message for initiating the migration of the source virtual machine.

6. A method implemented by a source virtual machine, the method comprising:

receiving, from a physical network interface card, a status information read notification, wherein the source virtual machine is running on a host device and corresponds to a virtual network interface card running on the physical network interface card;

reading status information of the virtual network interface card from a memory of the source virtual machine according to the status information read notification, wherein the status information is written to the memory by the physical network interface card in a direct memory access manner via the virtual network interface card; and rewriting the status information to the memory of the source virtual machine to cause a virtual machine migration management unit to identify a change to data in the memory and migrate the status information from the memory of the source virtual machine to a destination virtual machine.

7. The method of claim 6, wherein before receiving the status information read notification, the method further comprises:

receiving, from the virtual machine migration management unit, a first message for initiating a migration of the source virtual machine;

reading, according to the first message, first data from the memory, wherein the first data is written to the memory by the physical network interface card in a direct memory access manner through the virtual network interface card; and rewriting the first data to the memory of the source virtual machine to cause the virtual machine migration management unit to identify a change to data in the memory and migrate the first data from the memory of the source virtual machine to the destination virtual machine.

8. The method of claim 7, wherein reading the first data comprises reading the first data from a memory page for storing the first data in the memory, and wherein rewriting the first data to the memory comprises rewriting the first data to the memory page.

9. A method comprising:

receiving, by a source virtual machine and from a virtual machine migration management unit, a first message for initiating a migration of the source virtual machine, wherein the source virtual machine runs on a host device and corresponds to a first virtual network interface card running on a physical network interface card;

reading, by the source virtual machine according to the first message, first data from a memory of the source virtual machine, wherein the first data is written to the memory by the physical network interface card in a direct memory access manner through the first virtual network interface card;

rewriting, by the source virtual machine, the first data to the memory of the source virtual machine to cause the virtual machine migration management unit to identify a first change to data in the memory and migrate the first data from the memory of the source virtual machine to a destination virtual machine;

receiving, by the source virtual machine and from the virtual machine migration management unit, a second message for shutting down the source virtual machine;

writing, by the source virtual machine according to the second message, status information of the first virtual network interface card to the memory of the source virtual machine to cause the virtual machine migration management unit to identify a second change to the data in the memory and migrate the status information of the first virtual network interface card from the memory of the source virtual machine to the destination virtual machine; and migrating, by the virtual machine migration management unit, the data in the memory to the destination virtual machine, wherein the data in the memory comprise the first data and the status information of the first virtual network interface card.

10. The method of claim 9, wherein reading the first data comprises reading the first data from a memory page for storing the first data in the memory, and wherein rewriting the first data to the memory comprises rewriting, by the source virtual machine, the first data to the memory page.

11. The method of claim 9, further comprising notifying, by the source virtual machine, the virtual machine migration management unit of a memory address, in the memory, of the status information.

12. The method of claim 11, further comprising:

receiving, by the destination virtual machine and from the virtual machine migration management unit, a notification comprising the memory address of the status information in the memory;

acquiring, by the destination virtual machine, the status information from migrated memory data according to the memory address; and restoring, by the destination virtual machine according to the status information, a second virtual network interface card corresponding to the destination virtual machine.

13. A method comprising:
receiving, by a source virtual machine and from a virtual machine migration management unit, a first message for initiating a migration of the source virtual machine, wherein the source virtual machine runs on a host device and corresponds to a first virtual network interface card running on a physical network interface card;
reading, by the source virtual machine according to the first message, first data from a memory of the source virtual machine, wherein the first data is written to the memory by the physical network interface card in a direct memory access manner through the first virtual network interface card;
rewriting, by the source virtual machine, the first data to the memory of the source virtual machine to cause the virtual machine migration management unit to identify a first change to data in the memory and migrate the first data from the memory of the source virtual machine to a destination virtual machine;
receiving, by the source virtual machine and from the physical network interface card, a status information read notification;
reading, by the source virtual machine, status information of the first virtual network interface card from the memory according to the status information read notification;
rewriting, by the source virtual machine, the status information to the memory of the source virtual machine to cause the virtual machine migration management unit to identify a second change to data in the memory and migrate the status information of the first virtual network interface card from the memory of the source virtual machine to the destination virtual machine; and
migrating, by the virtual machine migration management unit, data in the memory to the destination virtual machine,
wherein the data in the memory comprise the first data and the status information.

14. The method of claim 13, wherein reading the first data comprises reading the first data from a memory page for storing the first data in the memory, and wherein rewriting the first data to the memory comprises rewriting, by the source virtual machine, the first data to the memory page.

15. The method of claim 13, further comprising sending, by the source virtual machine to the virtual machine migration management unit, a notification comprising a memory address, in the memory, of the status information.

16. The method of claim 15, further comprising:
receiving, by the destination virtual machine and from the virtual machine migration management unit, the notification;
acquiring, by the destination virtual machine, the status information from migrated memory data according to the memory address in the notification; and
restoring, by the destination virtual machine according to the status information, a second virtual network interface card corresponding to the destination virtual machine.

17. A virtual machine system comprising:
a virtual machine migration management unit configured to send a first message for initiating a migration of a source virtual machine;
a physical network interface card configured to run a virtual network interface card; and
a host device configured to run the source virtual machine, wherein the source virtual machine corresponds to the virtual network interface card, comprises a memory, and is configured to:
receive the first message from the virtual machine migration management unit;
read, according to the first message, first data from the memory, wherein the first data is written to the memory by the physical network interface card in a direct memory access manner through the virtual network interface card; and
rewrite the first data into the memory of the source virtual machine to cause the virtual machine migration management unit to identify a first change to data in the memory and migrate the first data from the memory of the source virtual machine to a destination virtual machine.

18. The virtual machine system of claim 17, wherein the source virtual machine is further configured to:
receive, from the virtual machine migration management unit, a second message for shutting down the source virtual machine; and
write status information of the virtual network interface card in the memory according to the second message.

19. The virtual machine system of claim 17,
wherein the virtual machine migration management unit is further configured to send a third message for shutting down the source virtual machine to the physical network interface card, and
wherein the physical network interface card is further configured to:
write, according to the third message, status information of the virtual network interface card in the memory in a direct memory access manner; and
send a status information read notification to the source virtual machine, and
wherein the source virtual machine is further configured to:
receive the status information read notification from the physical network interface card;
read the status information from the memory according to the status information read notification; and
rewrite the status information into the memory of the source virtual machine to cause the virtual machine migration management unit to identify a second change to the data in the memory and migrate the status information of a first virtual network interface card from the memory of the source virtual machine to the destination virtual machine.

20. The virtual machine system of claim 17, wherein the source virtual machine is further configured to:
read the first data from a memory page for storing the first data in the memory; and
rewrite the first data in the memory page.

21. A virtual machine system comprising:
a virtual machine migration management unit configured to send a message for shutting down a source virtual machine;
a physical network interface card configured to:
run a virtual network interface card corresponding to the source virtual machine;
receive, from the virtual machine migration management unit, the message;
write, according to the message, status information of the virtual network interface card in a memory of the source virtual machine in a direct memory access manner; and send a status information read notification to the source virtual machine; and
a host device configured to run the source virtual machine, wherein the source virtual machine is configured to:
receive the status information read notification from the physical network interface card;
read the status information from the memory according to the status information read notification; and
rewrite the status information in the memory of the source virtual machine to cause the virtual machine migration management unit to identify a first change to data in the memory and migrate the status information of the virtual network interface card from the memory of the source virtual machine to a destination virtual machine.

22. The virtual machine system of claim 21, wherein the physical network interface card is further configured to write first data to the memory through the virtual network interface card in a direct memory access manner, and
wherein the source virtual machine is further configured to:
receive, from the virtual machine migration management unit, a first message for initiating the migration of the source virtual machine;
read, according to the first message, the first data from the memory; and
rewrite the first data into the memory of the source virtual machine to cause the virtual machine migration management unit to identify a second change to data in the memory and migrate the first data from the memory of the source of the virtual machine to the destination virtual machine.

23. A virtual machine system comprising:
a virtual machine migration management unit configured to send a first message for initiating a migration of a source virtual machine and a second message for shutting down the source virtual machine;
a physical network interface card configured to run a first virtual network interface card; and
a host device configured to run the source virtual machine, wherein the source virtual machine corresponds to the first virtual network interface card, comprises a memory, and is configured to:
receive the first message from the virtual machine migration management unit;
read, according to the first message, first data from the memory, wherein the first data is written to the memory by the physical network interface card in a direct memory access manner through the first virtual network interface card;
rewrite the first data into the memory of the source virtual machine to cause the virtual machine migration management unit to identify a first change to data in the memory and migrate the first data from the memory of the source virtual machine to a destination virtual machine;
receive, from the virtual machine migration management unit, the second message; and
write, according to the second message, status information of the first virtual network interface card into the memory of the source virtual machine the virtual machine migration management unit to identify a second change to the data in the memory and migrate the status information of the first virtual network interface card from the memory of the source virtual machine to a destination virtual machine,
wherein the virtual machine migration management unit is further configured to migrate the data in the memory to the destination virtual machine, and
wherein the data comprise the first data and the status information.

24. The virtual machine system of claim 23, wherein the source virtual machine is further configured to send, to the virtual machine migration management unit, a notification comprising a memory address of the status information.

25. The virtual machine system of claim 24, wherein the destination virtual machine is configured to:
receive the notification from the virtual machine migration management unit;
acquire the status information from migrated memory data according to the memory address; and
restore, according to the status information, a second virtual network interface card corresponding to the destination virtual machine.

26. A virtual machine system comprising:
a virtual machine migration management unit configured to:
send a first message for initiating a migration of a source virtual machine; and
send a third message for shutting down the source virtual machine;
a physical network interface card configured to run a first virtual network interface card; and
a host device configured to run the source virtual machine, wherein the source virtual machine corresponds to the first virtual network interface card, comprises a memory, and is configured to:
receive the first message from the virtual machine migration management unit;
read, according to the first message, first data from the memory, wherein the first data is written to the memory by the physical network interface card in a direct memory access manner through the first virtual network interface card; and
rewrite the first data into the memory of the source virtual machine to cause the virtual machine migration management unit to identify a first change to data in the memory and migrate the first data from the memory of the source virtual machine to a destination virtual machine;
wherein the physical network interface card is further configured to:
receive, from the virtual machine migration management unit, the third message;
write, according to the third message, status information of the first virtual network interface card in the memory in a direct memory access manner through the first virtual network interface card; and
send a status information read notification to the source virtual machine,
wherein the source virtual machine is further configured to:
receive the status information read notification from the physical network interface card;
read the status information from the memory according to the status information read notification; and
rewrite the status information into the memory of the source virtual machine to cause the virtual machine migration management unit to identify a second change to the data in the memory and migrate the status information of the first virtual network interface card from the memory of the source virtual machine to a destination virtual machine, wherein the virtual machine migration management unit is further configured to migrate the data in the memory to the destination virtual machine, and wherein the data comprise the first data and the status information.

* * * * *

UNITED STATES PATENT AND TRADEMARK OFFICE
CERTIFICATE OF CORRECTION

PATENT NO. : 10,802,870 B2
APPLICATION NO. : 14/794325
DATED : October 13, 2020
INVENTOR(S) : Shengwen Lu Page 1 of 1

It is certified that error appears in the above-identified patent and that said Letters Patent is hereby corrected as shown below:

In the Claims

Column 37, Line 62, Claim 23 should read: "of the source virtual machine to cause the virtual machine migration management unit to identify"

Signed and Sealed this
Seventeenth Day of November, 2020

Andrei Iancu
*Director of the United States Patent and Trademark Office*